(12) United States Patent
Van Hoof et al.

(10) Patent No.: US 7,080,238 B2
(45) Date of Patent: Jul. 18, 2006

(54) NON-BLOCKING, MULTI-CONTEXT PIPELINED PROCESSOR

(75) Inventors: Werner Van Hoof, Veradale, WA (US); Jerrold Wheeler, Spokane, WA (US); Mathieu Tallegas, Veradale, WA (US)

(73) Assignee: Alcatel Internetworking, (PE), Inc., Spokane, WA (US)

( * ) Notice: Subject to any disclaimer, the term of this patent is extended or adjusted under 35 U.S.C. 154(b) by 874 days.

(21) Appl. No.: 09/941,528

(22) Filed: Aug. 30, 2001

(65) Prior Publication Data

US 2002/0054594 A1 May 9, 2002

Related U.S. Application Data (60) Provisional application No. 60/246,447, filed on Nov. 7, 2000, provisional application No. 60/278,310, filed on Mar. 23, 2001.

(51) Int. Cl.
*G06F 9/38* (2006.01)
(52) U.S. Cl. .......................................... 712/234; 712/1
(58) Field of Classification Search ................ 712/23, 712/32, 235, 241, 234, 225, 219, 228
See application file for complete search history.

(56) References Cited

U.S. PATENT DOCUMENTS 6,829,697 B1 * 12/2004 Davis et al. ................. 712/21

FOREIGN PATENT DOCUMENTS

| EP | 0945810 A | 9/1999 |
|---|---|---|
| WO | WO 00/29942 A | 5/2000 |

OTHER PUBLICATIONS

Omondi et al, "Shared Pieplines: Effective Pipelining in Multiprocessor Systems", Proceedings of the International Conference on Parallel Processing. Aug. 19-22, 1986, Washingon. IEEE Comp. Soc. Press. US, pp. 511-514, XP 000756974.

EZ Chip Technologies, "Network Processor Designs for Next-Generation Networking Equipment", EZCHIP White Paper, 'Online!, Dec. 27, 1999. XP))2262747.

(Continued)

*Primary Examiner*—William M. Treat
(74) *Attorney, Agent, or Firm*—Craig A. Hoersten; V. Lawrence Sewell (57) ABSTRACT

A packet processor whose processing capabilities are optimized by concurrently processing multiple packets within various pipelined stages. At each stage, multiple packets are processed via an internally pipelined sub-processor. In one embodiment, the packets are processed in a round robin fashion. When a particular packet is done processing at a particular stage, it may pass another packet whose processing is not complete, and move to a next stage. In another embodiment, a packet is processed until a conditional branch instruction or any other instruction causing a potential stall is encountered. If such an instruction is encountered, a next available packet is selected and processed instead of wasting processing cycles during the stall, or proceeding with the processing of the current packet based on a predicted result. The sub-processor resumes processing of the packet once the stall is over.

2 Claims, 7 Drawing Sheets

OTHER PUBLICATIONS

Farrens et al, "Strategies for Achieving Improved Processor Throughput", Computer Architecture News, Association for Computing Machinery, New York, US, vol. 19, No. 3, May 1, 1991, pp. 362-269 (SP000229171.

Li et al, "The Effects of STEF in Finely Parallel Multithreaded Processors", High-Performance Computer Architecture, 1995. First IEEE Symposium on Raleigh, N.C., USA Jan. 22-25, 1995, Los Alamitos, CA, USA, IEEE Comput. Soc. Jan. 22, 1995, pp. 318-325 XP010130108.

Internet papers: Heinanen, J. et al.; *Assured Forwarding PHB Group*; Network Working Group Request for Comments: 2597; Jun. 1999; 10 pp.

Internet papers: Jacobson, V. et al.; *An Expedited Forwarding PHB*; Network Networking Group Request for Comments: 2598; Jun. 1999; 10 pp.

\* cited by examiner

NON-BLOCKING, MULTI-CONTEXT PIPELINED PROCESSOR

CROSS-REFERENCE TO RELATED APPLICATIONS

This application claims the benefit of U.S. provisional application Nos. 60/246,447 entitled "High Speed Network Processor" filed Nov. 7, 2000, and 60/278,310 entitled "Non-Blocking, Multi-Context Pipelined Processor" filed Mar. 23, 2001, the contents of which are incorporated herein by reference.

FIELD OF THE INVENTION

This invention relates generally to packet switching controllers in a data network, and more particularly, to maximizing usage of a pipelined packet processor in processing incoming data packets.

BACKGROUND OF THE INVENTION

Legacy packet processors complete all processing tasks on a first packet data before starting processing a second packet data. Conventional pipelined packet processors have streamlined packet processing relative to legacy packet processors by allowing processing to begin on the second packet data before completing processing on the first packet data. Such conventional pipelining is generally accomplished by implementing different sets of processing tasks at different stages of a pipeline that execute independently, concurrently processing different packet data at the different stages.

One problem with the described conventional pipelined packet processors is that the stages are blocking. Specifically, the speed through the processing pipeline is only as fast as the slowest packet in the chain. A packet that is completed early at a current stage must generally wait to proceed to a next stage if the next stage is busy processing another frame. Thus, the processing capabilities of the current stage may become underutilized while awaiting for the next stage to complete processing.

Another problem with existing processor technology is the execution of conditional branch instructions typically carried out during packet processing at each stage. Conditional branch instructions take the form of "if <condition> then <action>." Determining whether a branch condition is true or not typically requires several processor cycles during which information is fetched, decoded, executed and written. Because the next conditional branch instruction for execution in a series is dependent upon the previous branch condition result, existing processors have either waited several processor cycles for the actual result to be returned, or have continued processing based on a predicted result. Both of these solutions can result in severe timing penalties. Waiting for the actual result can substantially slow-down processing, while proceeding based on a predicted result can lead to loading of incorrect instructions that may later have to be flushed.

Accordingly, there is a need for a packet processor with improved throughput and processing efficiency. The processing capabilities of such a processor should not be underutilized while waiting for a next stage to become available and/or waiting for branch condition results. At the same time, such a processor should not be vulnerable to the risks of branch misprediction.

SUMMARY OF THE INVENTION

The present invention is directed to efficiently utilizing the packet processing capabilities of a packet processor by concurrently processing multiple packets within various pipelined stages.

In one embodiment of the invention, a packet processor includes a plurality of logic blocks (also referred to as stages). A first logic block of the packet processor performs one or more processing operations on packet data and a second logic block performs one or more processing operations on packet data in response to packet data output from the first logic block. Preferably, at least one of said first or second logic blocks outputs packet data in response to packet data input at time T+t, wherein t>0, to said at least one logic block prior to outputting packet data in response to packet data input at time T to said at least one logic block.

In another embodiment of the invention, a packet processor includes a plurality of logic blocks where each logic block includes an input receiving a first packet data associated with a first packet at time T and a second packet data associated with a second packet at time T+t, wherein t>0. Each logic block also includes a storage device storing the first packet data and the second packet data, and a sub-processor coupled to the storage device. The sub-processor alternates between processing the first packet data and the second packet data.

In an additional embodiment of the invention, a packet processor includes a plurality of logic blocks where each logic block includes an input receiving a first packet data associated with a first packet and a second packet data associated with a second packet. Each logic block also includes a storage device storing the first packet data and the second packet data, and a sub-processor coupled to the storage device. The sub-processor switches from processing the first packet data to processing the second packet data while awaiting a processing result for the first packet data.

In a further embodiment of the invention, a pipelined processor includes a plurality of logic blocks. A first logic block performs a first operation on a first processing instruction associated with a first packet and forwards the first processing instruction to a second logic block for performing a second operation. The first logic block receives a second processing instruction associated with a second packet if a potential stall is expected in processing the first processing instruction. The first logic block performs the first operation on the second processing instruction concurrently with the second operation on the first processing instruction.

It should be appreciated, therefore, that the present invention allows efficient utilization of the packet processing capabilities of a packet processor. The switching of packets being processed within a particular stage allows a packet that is done processing early to pass another that is still being processed. Furthermore, the switching of packets to process a next packet if a stall is encountered in the processing the current packet allows the processor to be fully utilized while awaiting processing results and/or without the risk of penalty of branch misprediction.

DESCRIPTION OF THE DRAWINGS

These and other features, aspects and advantages of the present invention will be more fully understood when considered with respect to the following detailed description, appended claims, and accompanying drawings where:

DESCRIPTION OF THE INVENTION

Figure 1:
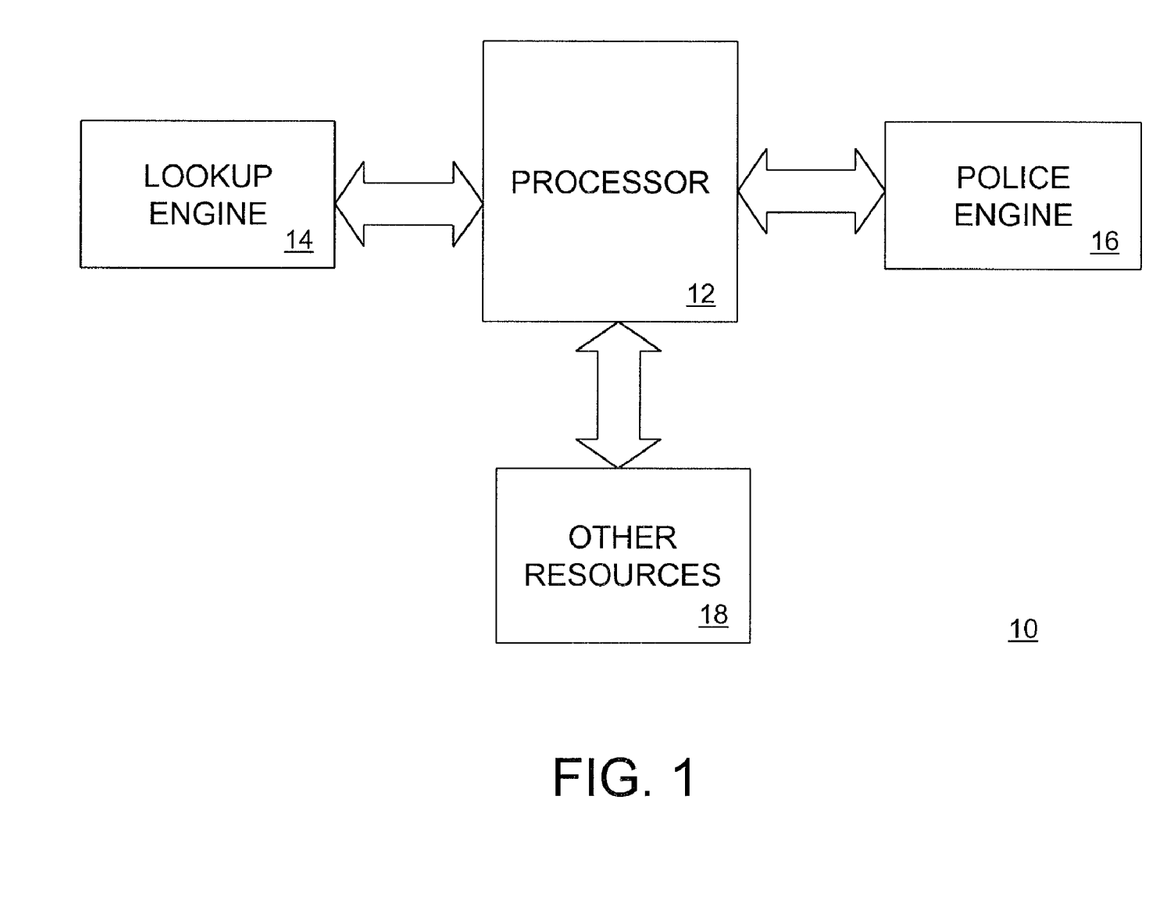
FIG. 1 is a block diagram of a packet switching controller having a packet processor for classifying and routing incoming flows of packets.

FIG. 1 is a block diagram of a packet switching controller 10 for classifying and routing incoming flows of packets. The packet switching controller preferably includes a packet processor 12 coupled to various resources according to one embodiment of the invention. The packet processor 12 may be implemented as an application specific integrated circuit (ASIC), but may also be implemented in any known hardware, firmware, or both.

The packet processor 12 preferably includes multiple sub-processors pipelined in series and operating independently of each other. The independent operation of the sub-processors allows the concurrent processing of different packet data at different stages of the pipeline. In addition, each sub-processor is also internally pipelined to allow current processing of multiple instructions associated with one or more packets within each stage.

The various resources coupled to the processor 12 include one or more lookup engines 14, police engines 16, and/or any other resources 18 for aiding the processing and routing of incoming flows of packets. The other resources 18 may include, but are not limited to quality of service (QoS) classification engines, access control lists, and the like.

The processor 12 preferably receives an inbound packet which may include Ethernet frames, ATM cells, TCIP/IP and/or UDP/IP packets, and other Layer 2 (Data Link/MAC Layer), Layer 3 (Network Layer), or Layer 4 (Transport Layer) data units. The processor 12 preferably creates a frame context for each incoming frame by storing all or a portion of the frame and related information in particular memory components, such as, for example, a frame memory, protocol memory, and register memory. The frame memory preferably includes the packet's header information. The protocol memory preferably stores a protocol table including one or more pointers to the protocol contained in the frame header memory. The register memory preferably stores any additional information on the frame necessary for its processing.

The processor 12 preferably processes the context in pipelined stages where a sub-processor at a particular stage performs an action for the context, modifies the context as necessary, and forwards the context to a next stage for action by a next sub-processor. At any given stage of the pipeline, the sub-processor preferably switches between various different frame contexts in processing the contexts. According to one embodiment of the invention, frame contexts are processed in a round robin fashion, constantly rotating between all the contexts. The number of contexts are preferably equal to the number of sub-processor pipeline stages plus the number needed to transfer the data in and out of the sub-processors.

According to this embodiment, if the processing of a current context is complete at the expiration of its context processing time, it is preferably deleted from the rotation and output to the next stage even if a processing time allotted to the entire stage has not expired. Thus, the stages in the pipeline are non-blocking, and a context that requires a relatively short processing time may "pass" a context that requires a relatively long processing time for that stage in the pipeline.

According to another embodiment of the invention, a frame context switch occurs upon detecting a potential stall in the processing of a current context. For example, a stall may be encountered when processing a conditional branch instruction or an external memory access for the context. When such a potential processing stall is encountered, the sub-processor preferably switches contexts to a next context frame that is ready to be processed. The next available context frame is also processed until a potential processing stall is encountered.

Figure 2:
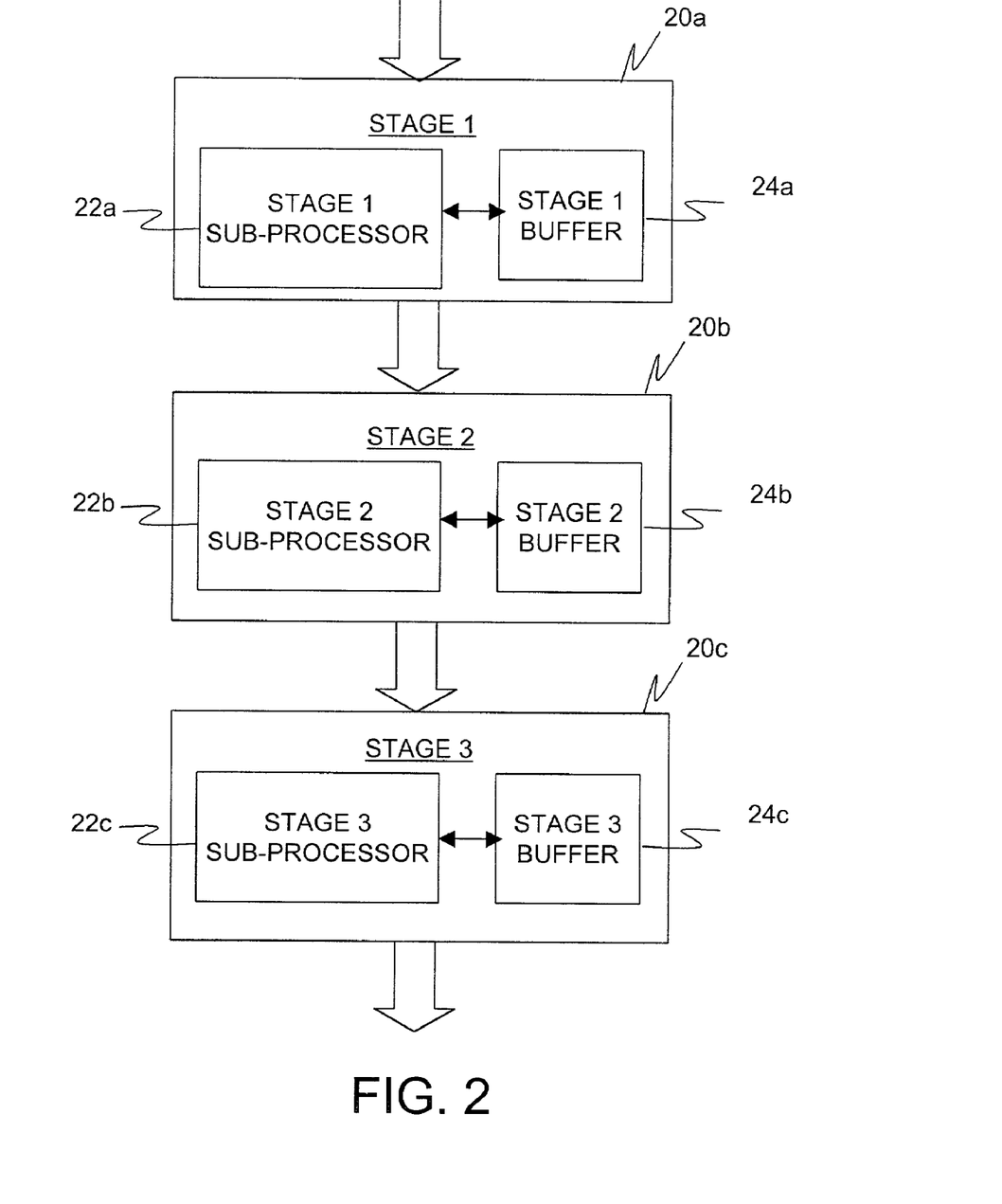
FIG. 2 is a more detailed functional block diagram of a packet processor including various pipelined stages according to one embodiment of the invention.

FIG. 2 is a more detailed functional block diagram of the processor 12 including various pipelined stages 20*a*–20*c* according to one embodiment of the invention. Each pipelined stage 20*a*–20*c* is preferably a logical block within the processor 12 that preferably includes a stage sub-processor 22*a*–22*c* and a stage buffer 24*a*–24*c*. The stage sub-processor is preferably a microprocessor engine configured to perform a particular processing action on the frame context, modify the context as required, and forward the context to the next stage in the pipeline. For instance, processing actions such as classification, address lookup, packet policing, packet forwarding, and program editing may each be performed in separate stages of the pipeline The stage buffer is preferably configured to hold a frame context while one or more resources 12, 16, or 18 process information issued for the context. Once a result is received from the resources, the sub-processor removes the context from the stage buffer and forwards it to the next stage.

The various stages 20*a*–20*c* in the pipeline preferably execute independently of each other, allowing the concurrent processing of the frame contexts at the different stages. According to one embodiment of the invention, the stages are non-blocking. Specifically, each sub-processor 22*a*–24*c* processes multiple frame contexts at a time allowing frames that require relatively short processing times to "pass" frames that require relatively long processing times. Thus, the sub-processor need not wait until the expiration of a processing time allotted to the stage before forwarding the context to the next stage if its processing is completed early.

Figure 3:
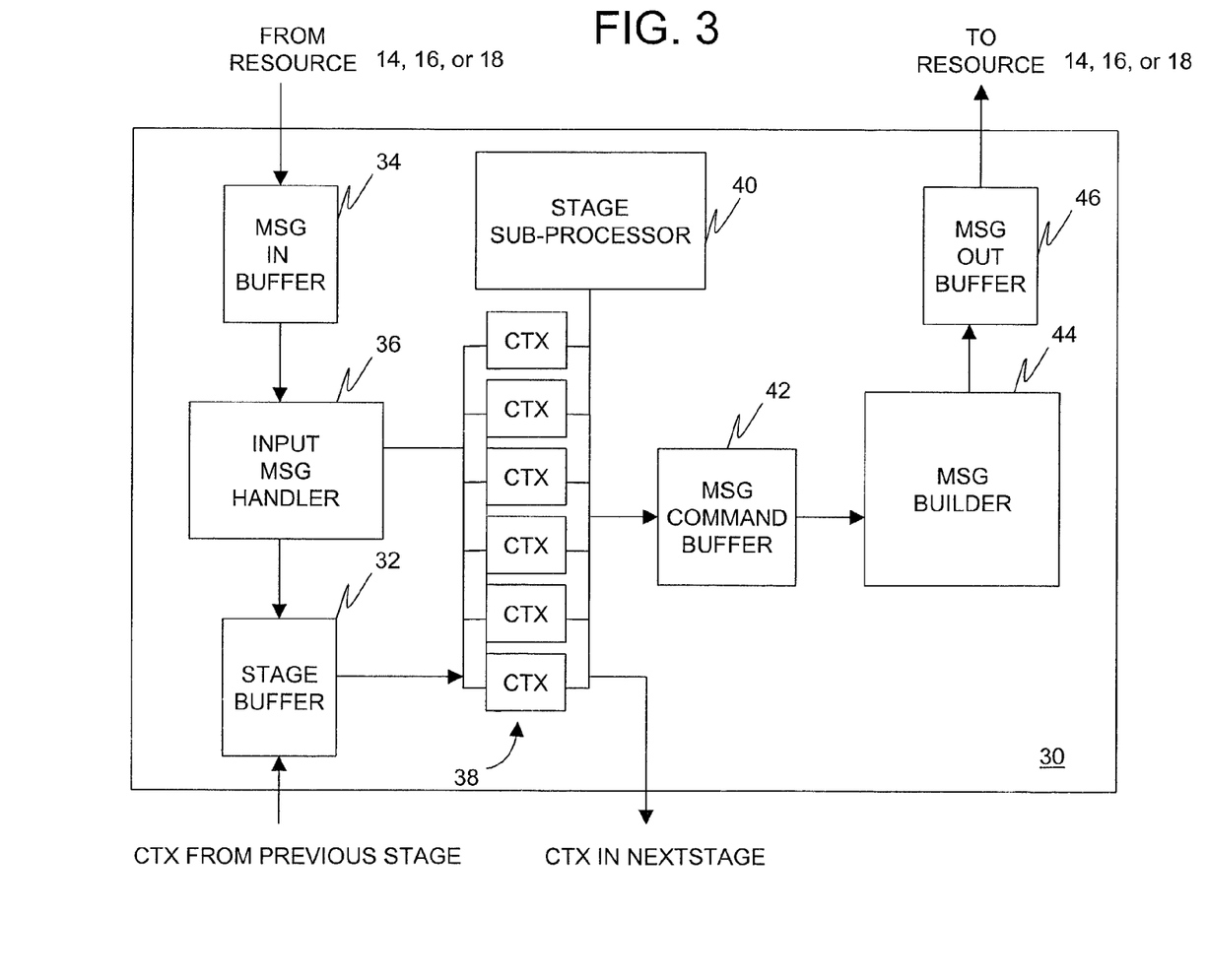
FIG. 3 is a functional diagram of a particular stage in a pipeline according to one embodiment of the invention.

FIG. 3 is a functional diagram of a particular stage 30 in the pipeline according to one embodiment of the invention. The particular stage 30 may be similar to stages 20*a*–20*c* of FIG. 2. A context from a previous stage is received by the particular stage 30 and stored in a stage buffer 32 which may be similar to stage buffers 24*a*–24*c*.

A message-in buffer 34 preferably receives one or more messages from one of the resources 14, 16, or 18 with processing results issued for the context. The one or more results are queued in the message-in buffer 34 which is preferably implemented as a FIFO buffer. An input message handler 36 dequeues the message and retrieves the associated context from the stage buffer 32. The input message handler updates the frame context and copies it to a context pool 38. The frame context is further marked as available for processing.

A stage sub-processor 40, which may be similar to the sub-processor 22a of FIG. 2, processes the contexts in the context pool 38. According to one embodiment of the invention, the contexts in the context pool 38 are processed in a round-robin fashion. According to this embodiment, the sub-processor 40 preferably processes each context for an allotted context processing time, such as, for example, one clock cycle, and performs a context switch for processing a next available context in the context pool after the allotted context processing time has expired. Preferably, the allotted context processing time is less than an overall processing time allotted to the particular stage 30. If the processing of the context is completed by the end of the allotted context processing time, it is preferably forwarded to the next stage.

In another embodiment of the invention, the sub-processor processes a context until it encounters an instruction that may potentially cause a stall, such as, for example, a conditional branch instruction or an external memory access. At this point, instead of waiting for a result to be returned, the sub-processor performs a context switch and processes a next instruction for a next available context in the context pool.

The internal pipeline architecture of the stage sub-processor 40 preferably allows the concurrent processing of various instructions for processing a context within each stage. In processing an instruction for a particular context, the sub-processor executes multiple operations, such as, for instance, an instruction fetch, instruction decode, execution, and memory access. Each operation is preferably executed in internally pipelined stages of the sub-processor 40.

During the processing of a particular context, the sub-processor 40 issues several message commands. The message commands are preferably queued in a message command buffer 42 which preferably implemented as a FIFO buffer. A message builder 44 preferably retrieves the message commands from the message command buffer 42 and processes them for creating outgoing messages for the context. For instance, an outgoing message may include a source/destination address for lookup in a routing table, or a police ID for policing a packet.

The message builder is preferably a co-processor that processes the message commands in parallel with the sub-processor. The outgoing messages are preferably queued in a message-out buffer 46 which is preferably implemented as a FIFO buffer. The outgoing messages are transmitted to an external resource 14, 16, or 18 and results are awaited from the resource. If processing of the context in the current stage is complete, the context is removed from the context pool 38 and forwarded to the next stage for storing in a next stage buffer. If there is no stage buffer in the next stage, the context is preferably copied directly to the context pool 38.

Figure 4:
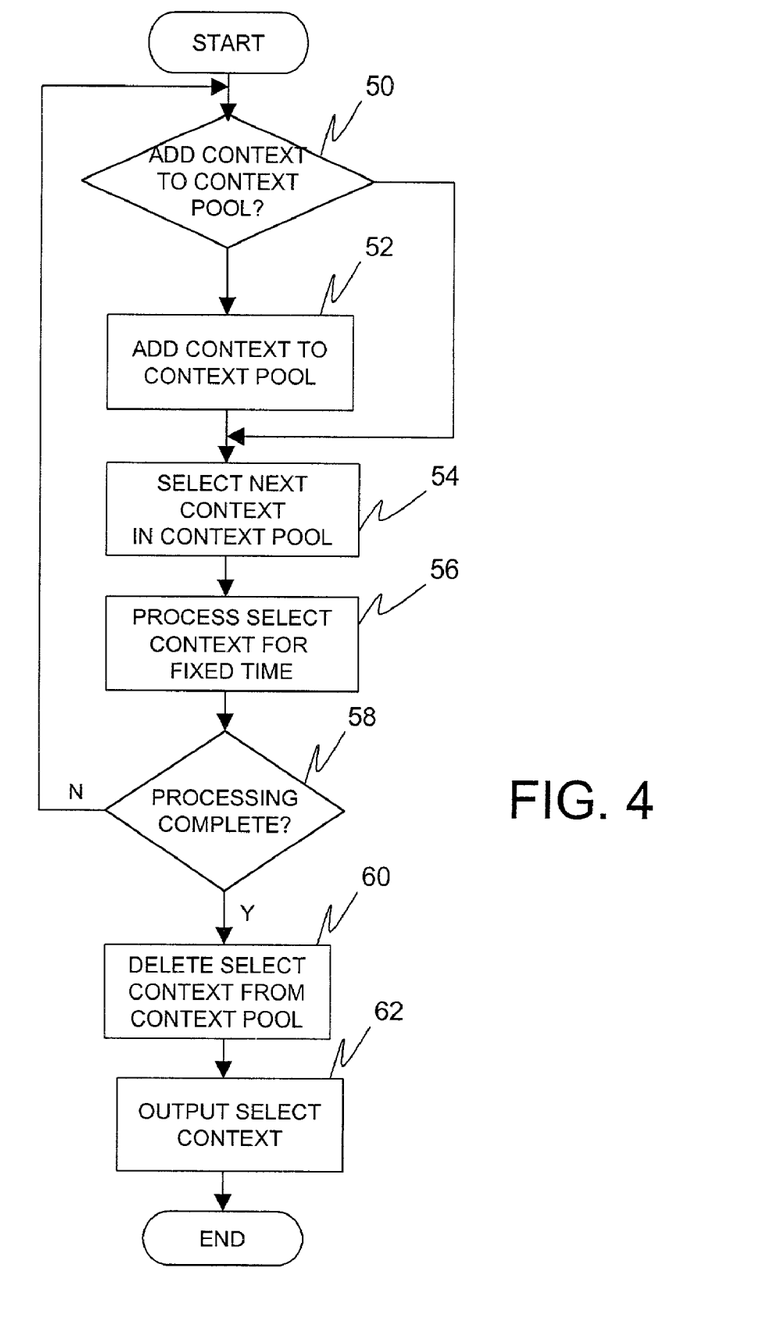
FIG. 4 is a flow diagram for processing contexts according to one embodiment of the invention.

FIG. 4 is a flow diagram for processing contexts according to one embodiment of the invention. The process starts, and in step 50, the input message handler 36 determines if a context is to be added to the context pool. If the answer is YES, the context is added to the context pool 38 in step 52. In step 54, the stage sub-processor 40 selects a next context in the context pool. In step 56, the selected context is processed for a fixed amount of time allotted to context processing, such as, for example, one clock cycle.

In step 58, determination is made as to whether the processing of the context is complete. If the answer is YES, the context is deleted from the context pool in step 60 and output in step 62 to a next stage, allowing the context to pass another with a longer processing time. If the processing of the context is not complete, as determined in step 58, a next context is selected for processing, but the current context is not removed from the rotation.

Figure 5:
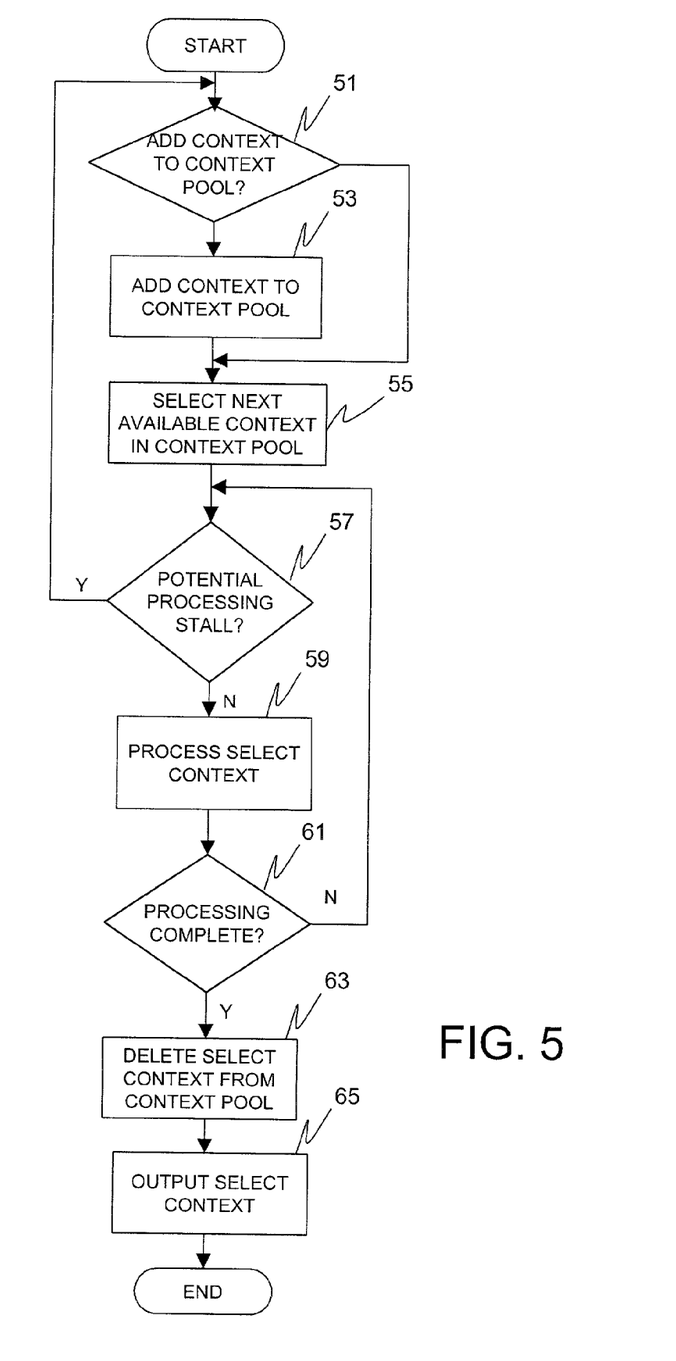
FIG. 5 is a flow diagram for processing contexts according to another embodiment of the invention.

FIG. 5 is a flow diagram for processing contexts according to another embodiment of the invention. The process starts, and in step 51, the input message handler 36 determines if a context is to be added to the context pool. If the answer is YES, the context is added to the context pool 38 in step 53. In step 55, the stage sub-processor 40 selects a next available context in the context pool. In step 57, the sub-processor determines if a potential processing stall is encountered. If the answer is YES, the sub-processor switches contexts to select a next available context in the context pool for processing.

If, however, a potential processing stall is not encountered in step 57, the sub-processor processes the context until either the processing is complete or a potential processing stall is encountered. If the processing of the context is complete, as determined in step 61, the context is deleted from the context pool in step 63 and output in step 65 to a next stage.

Figure 6:
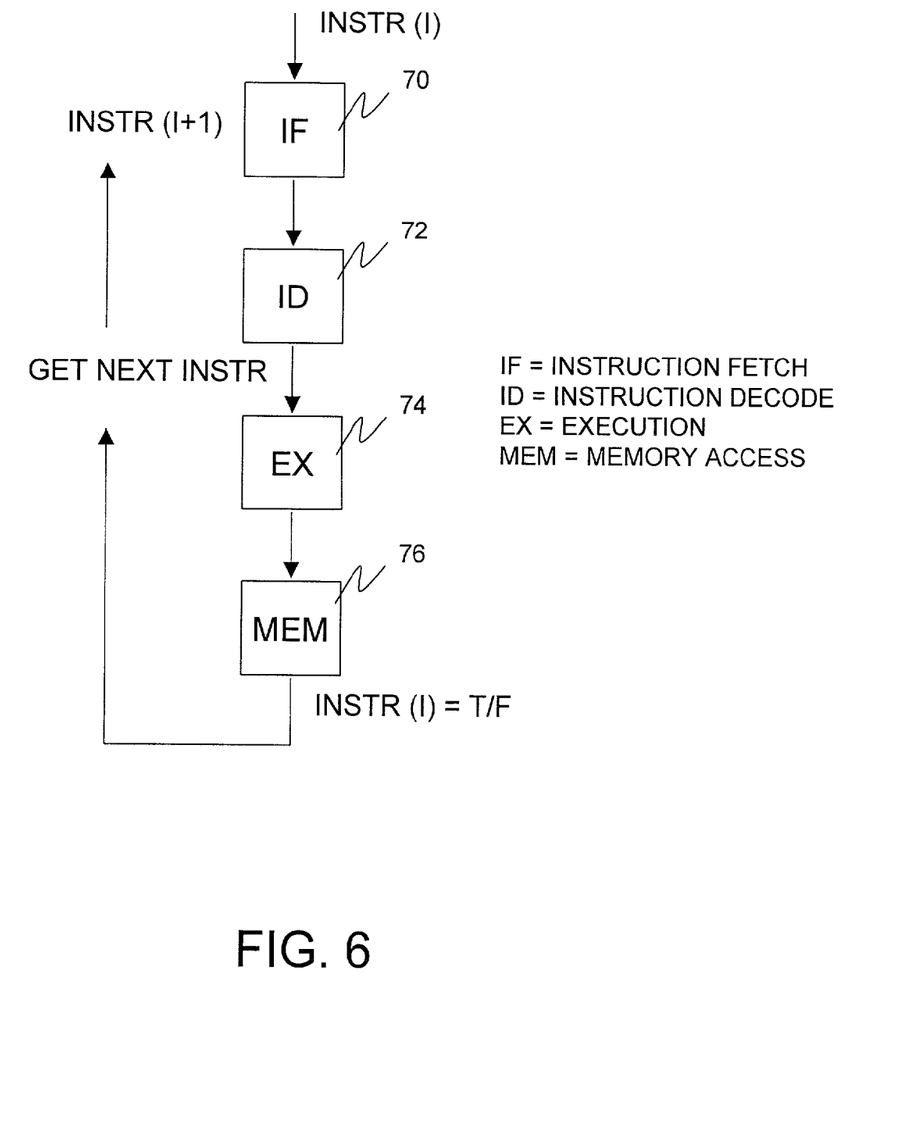
FIG. 6 is a flow diagram of operations performed by a stage processor in processing a particular instruction for a context according to the embodiment illustrated in FIG. 5.

FIG. 6 is a flow diagram of operations performed in processing a particular instruction for a context according to one embodiment of the invention. In step 70, the stage sub-processor performs an instruction fetch operation. In step 72, the instruction is decoded and in step 74, executed. In step 76, a memory access is performed for preferably writing back the results of the execution. If the instruction is a conditional branch instruction, the result of the instruction is preferably a true or false value determining a next instruction to be fetched, decoded, and executed.

Figure 7:
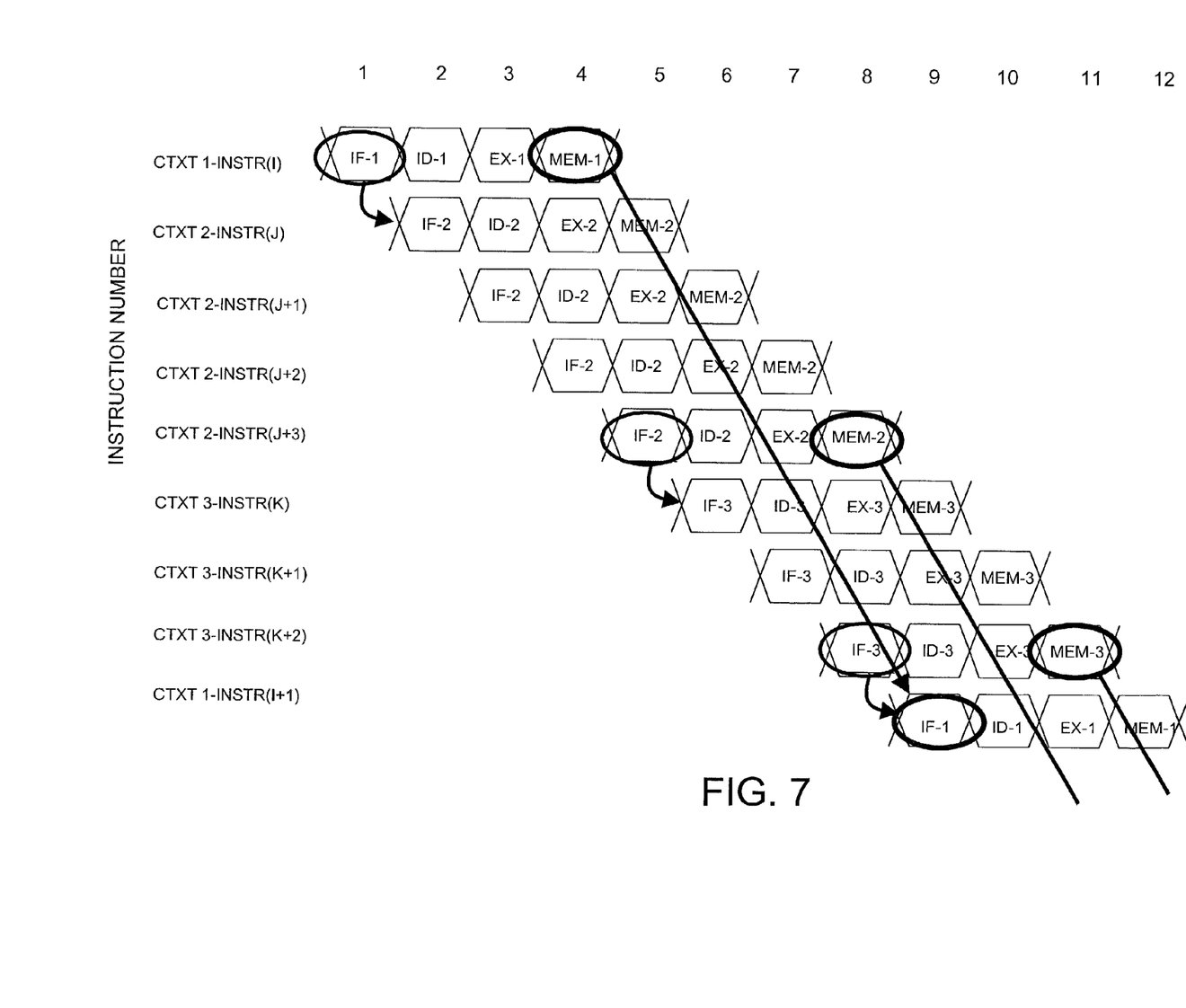
FIG. 7 is a diagram of pipelining operations in processing multiple contexts according to the embodiment illustrated in FIG. 5.

FIG. 7 is a diagram of the processing operations illustrated in FIG. 5 when applied to multiple contexts according to the embodiment illustrated in FIG. 5. At clock cycle 1, the sub-processor in the first stage of the internal pipeline processes instruction I for context 1 by conducting an instruction fetch operation. If the instruction at this internal stage is identified as an instruction that introduces a potential stall, a next-context flag is generated to switch contexts. The identification of potential stalls may be made possible by directly encoding such information into the instructions. For example, instructions causing potential stalls may include a stall-bit that is set to "1."

The sub-processor, at clock cycle 2, forwards instruction I to the instruction decode stage of the internal pipeline. At the same time, the instruction fetch stage of the processor becomes available to fetch a new instruction. However, because the next context flag has been set, the sub-processor fetches instruction J for a next available context in the rotation, context 2, instead of fetching a next instruction for context 1. Instruction J in the illustrated example does not create a potential stall. Accordingly, instructions for context 2 continue to be fetched and inserted in the sub-processor processing chain until a potential stall is detected.

At clock cycle 5, a potential stall is detected when processing instruction J+3 for context 2. As a result, a switch context flag is generated causing an instruction for a next available context in the rotation to be fetched at clock cycle 6. In the illustrated example, instruction K from context 3 is fetched for processing. At clock cycle 8, the sub-processor decodes another stall-inducing instruction K+2 from context 3. This causes a context switch during cycle 9 to the next available context, which is in this example, is context 1. At that time, the result for instruction I is available, so a next instruction may be processed for context 1 without a penalty of misprediction or encountering other immediate stalls.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

The invention claimed is:

1. A packet processor comprising:
   a plurality of logical blocks, each of said plurality of logical blocks includes a sub-processor, said plurality of logical blocks pipelined in series with each other, each of said plurality of logical block operating independently of each other allowing concurrent processing of said plurality of sub-processors;
   each of said plurality of logical blocks further including
      an input receiving a first packet data associated with a first packet and a second packet data associated with a second packet;
      a storage device storing the first packet data and the second packet data;
      said sub-processor coupled to the storage device, the sub-processor switching from processing the first packet data to processing the second packet data while awaiting a processing result for the first packet data.

2. The packet processor of claim 1, wherein the processing result is a conditional branch instruction result.

* * * * *